July 31, 1934. A. TEN BOSCH, NJZN 1,968,180
SCREW PRESS
Filed Aug. 1, 1932   2 Sheets-Sheet 1
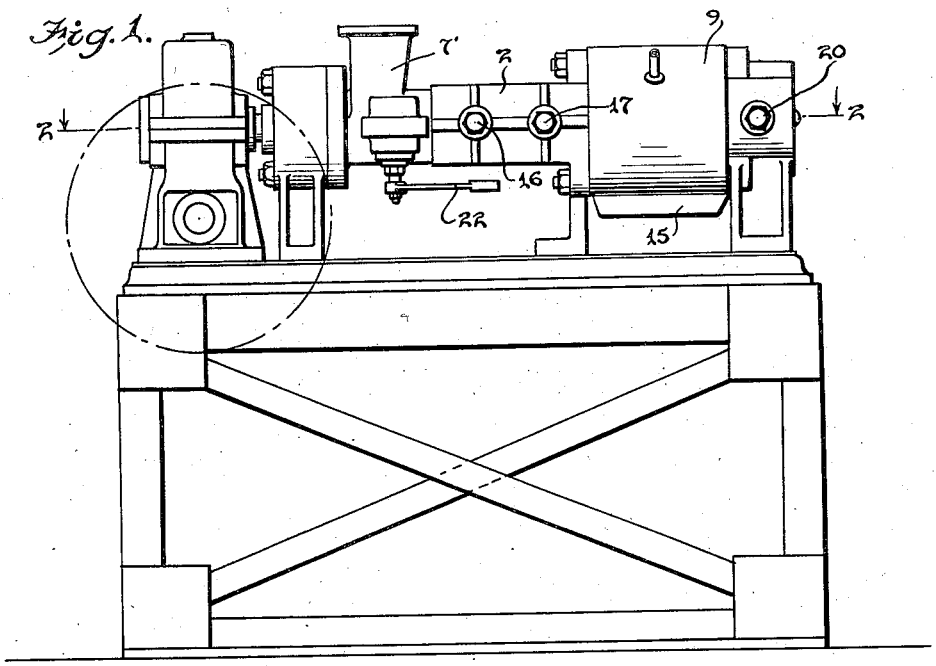
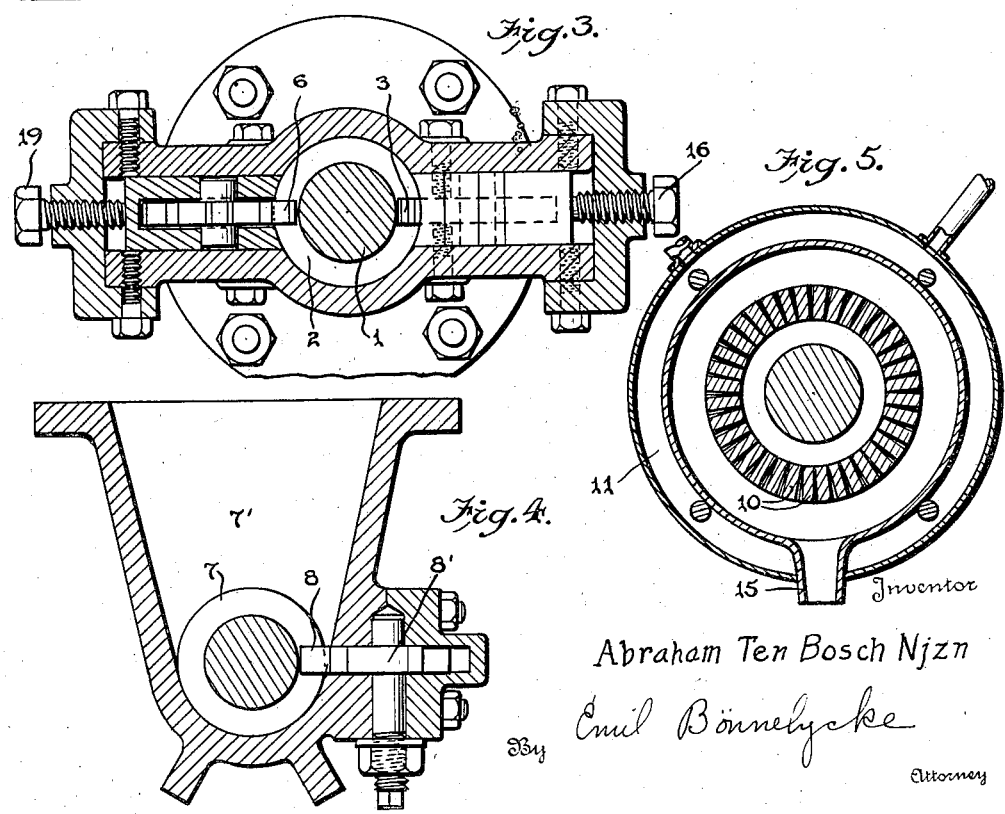
Inventor
Abraham Ten Bosch Njzn
By Emil Bönnelycke
Attorney

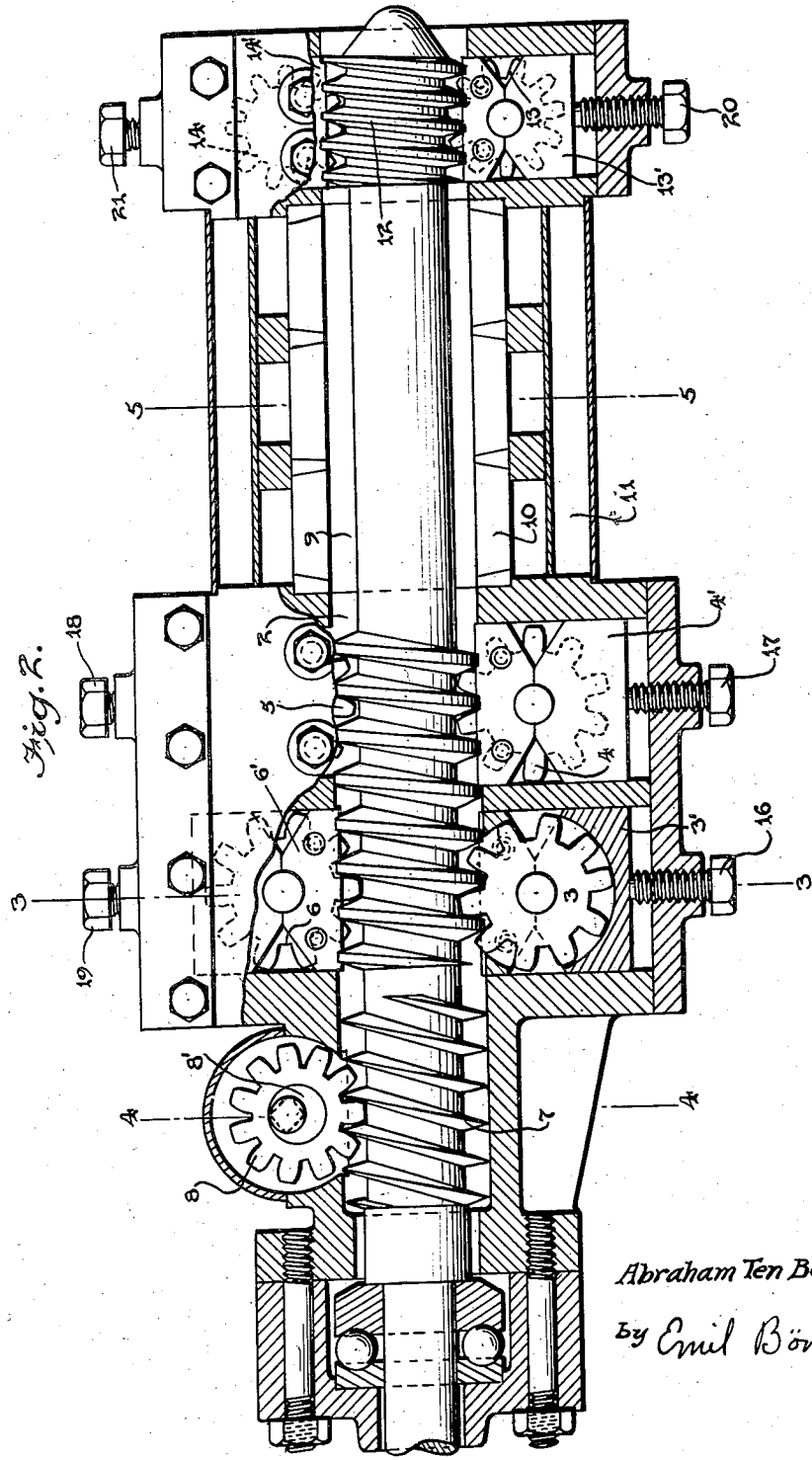

UNITED STATES PATENT OFFICE 1,968,180

SCREW PRESS

Abraham ten Bosch, NJzn, Arnhem, Netherlands, assignor to Naamlooze Vennootschap: Maatschappij tot Exploitatie van "ten Bosch Octrooien N. V.," Arnhem, Netherlands, a corporation of the Netherlands Application August 1, 1932, Serial No. 627,215
In the Netherlands September 18, 1931

2 Claims. (Cl. 100—48)

The invention relates to a screw press, in which the material is displaced under pressure to a pressing chamber by the thread of the press screw.

The displacement under pressure of material containing a large percentage of liquid by means of a screw press is in general not possible. The material rotates along with the screw thread without being advanced.

In order to remove this drawback it has already been proposed to arrange at one or more places stationary fingers or pins or a pinion carrying fingers extending through the wall of the screw chamber into the thread of the conveyor screw in order to thereby increase the friction against the wall and to prevent the material from rotating along at that place.

The invention which has for its object to attain this purpose in an improved and entirely satisfactory manner consists in principle in this, that teeth or members performing the same function cooperate in such a manner with the screw thread of the conveyor screw, that on rotation of the conveyor screw there are always one or more teeth or like members closing the screw thread, whereby the material is held and thus prevented from rotating along with the screw thread, while the screw thread needs not to be interrupted by means of fingers or pins as in the abovementioned closing means.

A practical embodiment according to the invention consists in this, that screw gears, e. g. a plurality of pairs thereof, are in engagement with the screw and by rotation of the latter are rotated themselves. The screw gears are mounted with respect to the screw in such a manner that there is always one tooth of at least one of the screw gears in full engagement with the screw. Preferably, however, there are several screw gears simultaneously in full engagement with the screw. By employing a plurality of screw gears it is possible to maintain the closure of the thread of the conveyor screw. A pair of screw gears may e. g. be arranged at the inlet end and a second pair at the outlet end of the screw. The screw gears extend through the wall of the screw chamber inwardly in such a manner that the teeth are in engagement with the screw. To the inlet end of the press screw a filling screw may adjoin, cooperating with one or if desired two adjustable screw gears in such a manner that the charge or/and the slip in the filling screw may be altered. The adjustment of said screw gear (or screw gears) is effected towards or away from the axis of the filling screw, so that the engagement of the teeth with the screw may be made more or less deep.

It will be clear that it depends on the diameter of the screw gear whether one tooth or a plurality of teeth simultaneously engage the press screw.

To the outlet end of the press screw a filter may adjoin and to the latter an end screw may adjoin, cooperating with a pair of screw gears as above described with reference to the press screw.

In order to prevent the liquid pressed out of the material from being carried along with a screw gear and thereupon being guided back to the press screw, a discharge opening or passage e. g. one for each screw gear, may according to the invention be provided in the wall of the casing enclosing the screw gear.

To facilitate the understanding of the present invention, I have shown in the accompanying drawings means for carrying the same into practical effect.

In the drawings:

Figure 1 is a side elevation of a press constructed in accordance with the present invention.

Fig. 2 is a horizontal sectional view taken on line 2—2 of Fig. 1.

Fig. 3 is a vertical sectional view taken through line 3—3 of Fig. 2.

Fig. 4 is another vertical sectional view taken on line 4—4 of Fig. 2.

Fig. 5 is still another vertical sectional view taken on line 5—5 of Fig. 2.

In the drawings the press screw 1 is arranged in a chamber 2 and cooperates with four screw gears 3, 4, 5 and 6. The screw gears 3 and 6 are located at either side of the screw as are the screw gears 4 and 5. The cooperation with the screw is such that at least one tooth of one of the screw gears 3—6 is in full engagement with the screw and closes the thread. If this tooth leaves the screw thread more or less, then the thread is again closed by a tooth of another screw gear. The rotation of the press screw brings about the rotation of the screw gears and the position of these screw gears with respect to the screw is always chosen such that the closing of the thread is ensured.

This closure needs not be effected by but one tooth of one screw gear; it is even better when two or more teeth of a plurality of screw gears simultaneously fully engage the screw. The material is supplied to the press screw 1 by a filling screw 7 operating in a filling chamber 7' comprising a radially adjustable screw gear 8 and is discharged from the press screw into a filter-chamber 9 tapering towards the outlet and comprising a filter 10 and a steam chamber 11, whereupon the material is discharged from the filter chamber into an end screw 12 having a pair of screw gears 13, 14 corresponding to the screw gears 3, 4 or 5, 6. Eventually liquid pressed out by the screw gears may be carried along through the casings of the screw gears. This liquid is however discharged through opening 15.

Gears 3, 4, 5, 6, 13 and 14 may be supported in blocks 3', 4', 5', 6', 13' and 14', respectively, slidably mounted in compartments of the casing of the press and are adjusted by screws 16, 17, 18, 19, 20 and 21, respectively. Gear 8 is mounted on an eccentric 8' adjustable by means of handle 22.

In the specification there is always question of "screw" gears, which expression also covers worm wheels, gear wheels, pinions and the like.

In the drawings only one screw gear has been shown in cooperation with a filling screw. However, there may be arranged also a second screw gear at the opposite side of the screw. When dealing with a weak mass the slip of the mass in the filling screw may be controlled and almost avoided by means of the screw gear shown and thus a regulation of the charge may be obtained, but when dealing with a mass containing but little moisture, e. g. brown coal, it is advantageous to arrange a screw gear at the opposite side of the filling screw so as to regulate the charge. The arrangement of the screw gears may be made dependent on the nature of the mass to be pressed out and two screw gears or only one single screw gear may be used.

I claim:

1. In a screw press, a cylindrical casing, a pressing screw rotatably mounted axially thereof, a gear extending through the casing and having its teeth meshing with the thread of said screw so that the screw thread is always filled by one of the teeth of the gear, a filling screw mounted axially of said casing for feeding material to be pressed to the pressing screw, a gear meshing with the thread of the filling screw and being adjustable toward and away from the filling screw, to vary the feed of material to the pressing screw.

2. In a screw press, a cylindrical casing, a pressure screw rotatably mounted axially thereof, a plurality of gears meshing with the thread of said screw so that the thread is always filled by a tooth of one of said gears, a filling screw for feeding material to be pressed to the pressing screw and a gear adjustable toward and away from the filling screw and having teeth meshing with the thread of the filling screw.

ABRAHAM TEN BOSCH, NJzN.